United States Patent
Ohno

(10) Patent No.: US 12,383,073 B2
(45) Date of Patent: *Aug. 12, 2025

(54) AIR MATTRESS

(71) Applicant: Paramount Bed Co., Ltd., Tokyo (JP)

(72) Inventor: Kenta Ohno, Tokyo (JP)

(73) Assignee: Paramount Bed Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,384

(22) Filed: Dec. 27, 2023

(65) Prior Publication Data

US 2024/0122365 A1    Apr. 18, 2024

Related U.S. Application Data

(63) Continuation of application No. 17/055,865, filed as application No. PCT/JP2019/023865 on Jun. 17, 2019, now Pat. No. 11,896,137.

(30) Foreign Application Priority Data

Jan. 15, 2019 (JP) .................................. 2019-004776
May 29, 2019 (JP) .................................. 2019-100244

(51) Int. Cl.
   *A47C 27/08*    (2006.01)
   *A47C 31/00*    (2006.01)
   (Continued)

(52) U.S. Cl.
   CPC .......... *A47C 27/083* (2013.01); *A47C 31/008* (2013.01); *G05B 15/02* (2013.01); *A47C 27/082* (2013.01); *G05D 7/0676* (2013.01)

(58) Field of Classification Search
   USPC ............................................ 700/282; 5/713
   See application file for complete search history.

(56) References Cited

U.S. PATENT DOCUMENTS 5,848,450 A * 12/1998 Oexman ............ A61G 7/05769
                                                 5/713
9,635,953 B2 * 5/2017 Nunn ..................... A47C 27/10
(Continued)

FOREIGN PATENT DOCUMENTS

CN    106963178 A    7/2017
JP    H04-9111 A    1/1992
(Continued)

OTHER PUBLICATIONS

International Search Report dated Sep. 4, 2019, mailed in counterpart International Application No. PCT/JP2019/023865, 12 pages.

*Primary Examiner* — Emilio J Saavedra
(74) *Attorney, Agent, or Firm* — Kim & Stewart LLP

(57) ABSTRACT

According to embodiments, an air mattress includes an air cell unit including an air cell, and a controller that controls an internal pressure in the air cell. The controller conducts a first operation when the internal pressure in the air cell satisfies the second condition after having satisfied a first condition. The first condition includes the internal pressure becoming from a first value to a second value lower than the first value, a difference between the first value and the second value being equal to or more than a first threshold, and a change rate relative to time of the internal pressure from the first value to the second value being equal to or more than a second threshold. The second condition includes, after the internal pressure has lowered from the first value to the second value, the internal pressure becoming a third value lower than the second value, and a difference between the second value and the third value being equal to or more than a third threshold. In the first operation, the controller changes the internal pressure toward the second value.

16 Claims, 7 Drawing Sheets

(51) Int. Cl.
    *G05B 15/02*     (2006.01)
    *G05D 7/06*      (2006.01)

(56)            References Cited

U.S. PATENT DOCUMENTS 10,149,549  B2    12/2018  Erko et al.
 2010/0287707  A1    11/2010  Beard et al.
 2014/0277778  A1*    9/2014  Nunn ................... A47C 27/082
                                                             700/282
 2017/0086598  A1*    3/2017  Ohno ................... A47C 27/083
 2019/0104858  A1*    4/2019  Erko ................... A47C 27/082

FOREIGN PATENT DOCUMENTS

JP           H05-68626  A        3/1993
 JP         2004-229875  A        8/2004
 JP         2008-281475  A       11/2008
 JP         2008-307249  A       12/2008
 JP          2016013315  A   *    1/2016
 JP         2017-064014  A        4/2017
 KR          20170051877 A        5/2017
 WO         2020/148930  A1       7/2020

* cited by examiner

AIR MATTRESS

CROSS-REFERENCE TO RELATED APPLICATIONS

This application is a continuation of U.S. patent application Ser. No. 17/055,865, filed Nov. 16, 2020, which is a national stage application, filed under 35 U.S.C. § 371, of International Patent Application No. PCT/JP2019/023865, filed Jun. 17, 2019, which is based upon and claims the benefit of priority from Japanese Patent Application No. 2019-004776, filed Jan. 15, 2019 and Japanese Patent Application No. 2019-100244, filed May 29, 2019, each of which is incorporated by reference herein in its entirety.

TECHNICAL FIELD

Embodiments of the present invention relate to an air mattress.

BACKGROUND ART

There are air mattresses in which air cells are used. The air mattresses are desired to be more comfortable.

CITATION LIST

Patent Literature

PTL 1: JP-A-2008-307249

SUMMARY OF INVENTION

Technical Problem

Embodiments of the present invention provide a more comfortable air mattress.

Solution to Problem

According to embodiments, an air mattress includes an air cell unit including an air cell, and a controller that controls an internal pressure in the air cell. The controller conducts a first operation when the internal pressure in the air cell satisfies a second condition after having satisfied a first condition. The first condition includes the internal pressure becoming from a first value to a second value lower than the first value, a difference between the first value and the second value being equal to or more than a first threshold, and a change rate relative to time of the internal pressure from the first value to the second value being equal to or more than a second threshold. The second condition includes, after the internal pressure has lowered from the first value to the second value, the internal pressure becoming a third value lower than the second value, and a difference between the second value and the third value being equal to or more than a third threshold. In the first operation, the controller changes the internal pressure toward the second value.

Advantageous Effects of Invention

The embodiments of the present invention can provide a more comfortable air mattress.

DESCRIPTION OF EMBODIMENTS

Figure 1:
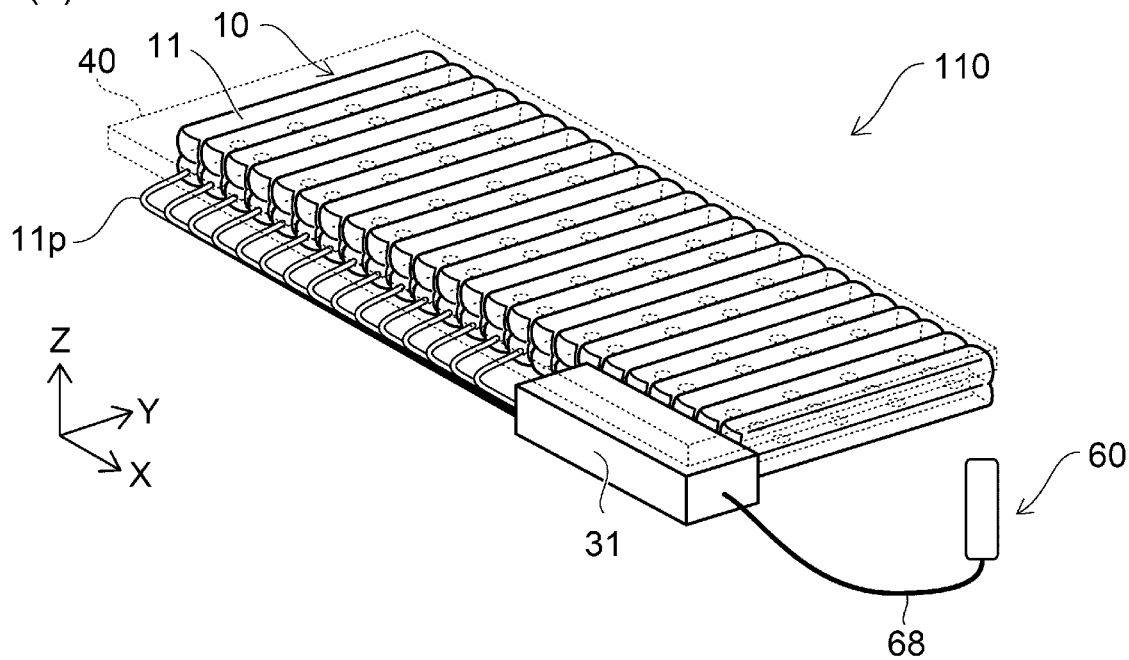
FIGS. 1(a) to 1(c) are schematic views exemplifying an air mattress according to a first embodiment.
Figure 1:
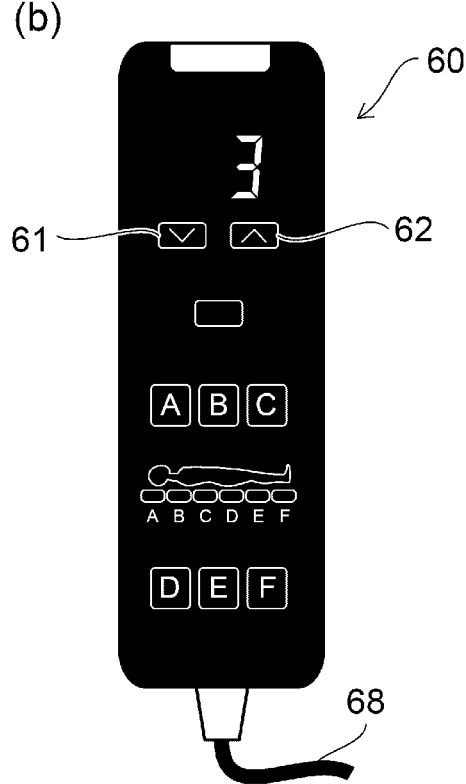
Figure 1:
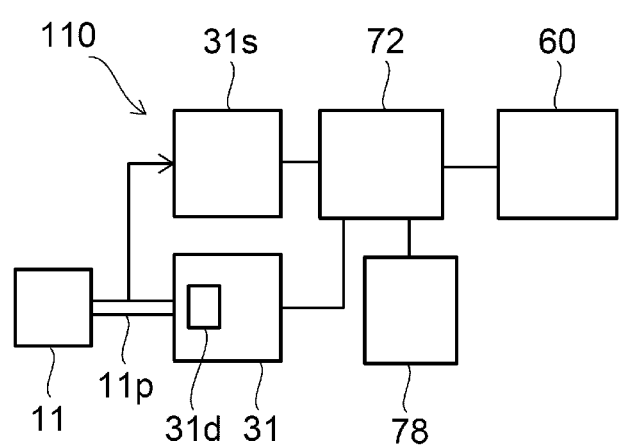

Hereinafter, embodiments of the invention will be described with reference to the drawings.

The drawings are schematic or conceptual, and the relation between the thickness and the width in each portion, and the ratio of the sizes between portions, and the like are not necessarily the same as actual ones. Even when the same portion is illustrated, the same portion is illustrated mutually differently in the size and the ratio depending on the drawing in some cases.

In the specification of the present application and the respective drawings, the similar elements having been described related to the already described drawing are assigned with the same reference numerals, and detailed explanations thereof are omitted as appropriate.

First Embodiment

FIGS. 1(a) to 1(c) are schematic views exemplifying an air mattress according to a first embodiment.

FIG. 1(a) is a perspective view exemplifying an air mattress 110 according to the embodiment. FIG. 1(b) is a plan view exemplifying a user interface device 60 of the air mattress 110. FIG. 1(c) is a function block diagram of the air mattress 110.

As illustrated in FIG. 1(a), the air mattress 110 according to the embodiment includes a plurality of air cells 11. As illustrated in FIG. 1(c), the air mattress 110 according to the embodiment further includes a controller 72.

As illustrated in FIG. 1(a), the plurality of the air cells 11 are included in an air cell unit 10. The plurality of the air cells 11 each are, for example, tubular.

The plurality of the air cells 11 are arranged along a first direction. An X axis direction is set as the first direction. One direction perpendicular to the X axis direction is set as a Z axis direction. A direction perpendicular to the X axis direction and the Z axis direction is set as a Y axis direction.

The first direction corresponds to, for example, a direction from the head to the legs when a user is laid on the air mattress 110. The Y axis direction corresponds to a right-and-left direction. The Z axis direction corresponds to a direction from a lower surface to an upper surface of the air mattress 110.

As illustrated in FIG. 1(a), in this example, an upper layer cushion unit 40 is provided on the air cell unit 10 (on the air cells 11). The upper layer cushion unit 40 includes, for example, a polymeric foam. The polymeric foam includes, for example, an urethane foam. The polymeric foam includes a plurality of holes.

When the air mattress 110 according to the embodiment is in use, the air cell unit 10 may be covered with a cover part or the like. The cover part or the like includes, for example, a material such as polyester.

As illustrated in FIG. 1(a), the air mattress 110 further includes a pump unit 31. The pump unit 31 is connected to the plurality of the air cells 11 respectively through tubes 11p. The pump unit 31 performs supply and exhaust of air to and from the plurality of the air cells 11.

In an example illustrated in FIG. 1(a), the controller 72 is provided in a housing of the pump unit 31. The controller 72 may, for example, include a processor. The controller 72 may be provided at a position different from that of the housing. The controller 72 may be of a smartphone type (for example, a portable terminal type).

As illustrated in FIG. 1(c), the controller 72 is connected to the pump unit 31. At least either arbitrary method of wired and wireless methods is applicable to the connection (for example, communication) between the controller 72 and the pump unit 31. The controller 72 controls the pump unit 31. The internal pressures in the plurality of the air cells 11 are controlled by an operation of the pump unit 31. In the embodiment, the "internal pressure" corresponds to a difference relative to the atmospheric pressure. For example, the "internal pressure" corresponds to the "gauge pressure".

As illustrated in FIG. 1(c), for example, a pressure sensor 31s (sensor) may be provided. The pressure sensor 31s is provided, for example, in the housing of the pump unit 31. For example, the pressure sensor 31s is capable of detecting the internal pressures in the plurality of the air cells 11. In one example, the internal pressures in the tubes 11p that are respectively connected to the plurality of the air cells 11 are detected, so that the respective internal pressures in the plurality of the air cells 11 can be detected.

As illustrated in FIGS. 1(a) and 1(b), the air mattress 110 may further include the user interface device 60. The user interface device 60 receives an input by a user. The user interface device 60 is, for example, an operation switch (for example, a remote controller). The controller 72 controls the internal pressures in the plurality of the air cells 11 in accordance with the input received by the user interface device 60. The user interface device 60 is connected to the controller 72 (or the pump unit 31) by at least either arbitrary method of wired and wireless methods. In this example, the user interface device 60 is connected to the controller 72 (or the pump unit 31) by a cable 68.

As illustrated in FIG. 1(b), for example, various kinds of buttons (display input units 61 and 62, and the like) are provided to the user interface device 60. The user manipulates these buttons to control the respective internal pressures in the plurality of the air cells 11 to be in desired states.

As illustrated in FIG. 1(c), a memory 78 may be provided. An internal pressure that the user desires may be stored in the memory 78. The controller 72 may control, on the basis of data stored in the memory 78, the internal pressures in the plurality of the air cells 11. The data may include a time change in the internal pressure. The controller 72 may control the respective internal pressures in the plurality of the air cells 11 (a plurality of blocks) so as to change in terms of time.

The controller 72 may control the internal pressure in the air cell 11 so as to become uniform. For example, there is a case in which the air leaks from a clearance of a connection portion or the like between the tube 11p and the air cell 11. Accordingly, for example, the internal pressure lowers by about 0.1 kPa to 0.5 kPa per day in some cases. For example, in order to recover the lowering of the internal pressure due to the leakage of air, the controller 72 may adjust the internal pressure on a regular basis. For example, when the internal pressure in the air cell 11 becomes lower than an allowable range of a set value, the controller 72 causes the pump unit 31 to supply air to the air cells 11. Accordingly, the internal pressure is adjusted so as to be within the allowable range. The lowering of the internal pressure in the air cell 11 due to the leakage of air is slow.

Meanwhile, when the user lies down on the air cell unit 10 including the air cells 11, the internal pressure in the air cells 11 rises. Further, at the bed-departure (when the user is not present on the air cell unit 10), the internal pressure in the air cells 11 suddenly lowers. In the occurrence of such sudden lowering of the internal pressure, if the internal pressure is raised so as to recover the lowering of the internal pressure, when the user again lies down on the air cell unit 10, the internal pressure becomes higher than the desired internal pressure. Accordingly, it has been understood that discomfort feeling is generated in some cases. The discomfort feeling impairs the comfort in some cases.

In the embodiment, as in the following, in the sudden change in the internal pressure as the above, an operation to recover the lowering of the internal pressure is not performed. Accordingly, a more comfortable air mattress can be provided. Hereinafter, an example of an operation according to the embodiment will be described. This operation is conducted by, for example, the controller 72.

Figure 2:
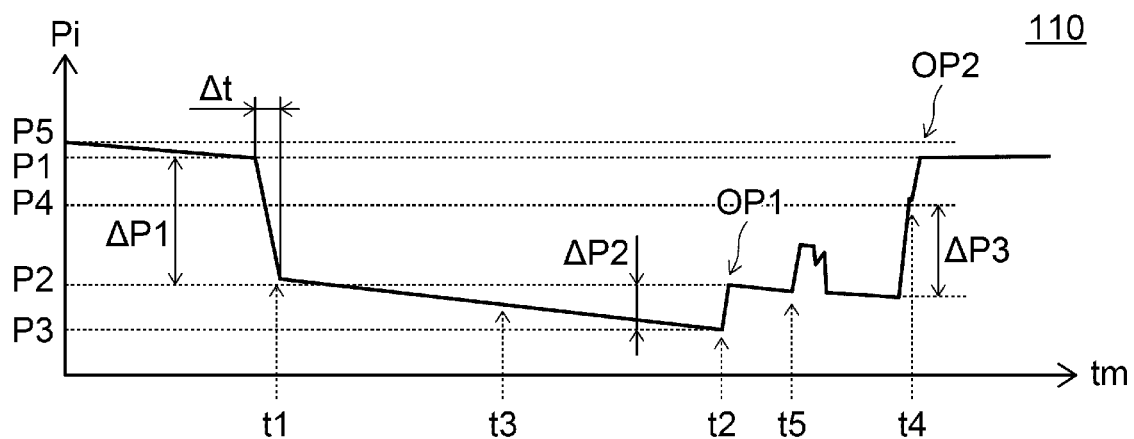
FIG. 2 is a schematic diagram exemplifying an operation of the air mattress according to the first embodiment.

FIG. 2 is a schematic diagram exemplifying an operation of the air mattress according to the first embodiment.

The horizontal axis in FIG. 2 represents time tm. The longitudinal axis represents an internal pressure Pi in the air cell.

As illustrated in FIG. 2, the controller 72 conducts a first operation OP1. The first operation OP1 is conducted when the internal pressure Pi in the air cell 11 satisfies a second condition below, after having satisfied a first condition below.

The first condition includes: the internal pressure Pi becoming, from a first value P1, a second value P2 lower than the first value P1; a difference ΔP1 between the first value P1 and the second value P2 being equal to or more than a first threshold; and a change rate of the internal pressure Pi relative to the time tm from the first value P1 to the second value P2 being equal to or more than a second threshold.

For example, in a case where the difference ΔP1 of the internal pressure Pi that is equal to or more than the first threshold is generated at the steepness equal to or more than the second threshold, the first condition is satisfied.

In the example in FIG. 2, the first condition is satisfied at a first time t1. For example, the user departs from the air mattress 110 (bed-departure) at the first time t1. Accordingly, the first condition is satisfied. For example, in the length of from 5 minutes to 12 hours, when the difference ΔP1 is equal to or more than 0.5 kPa, it is determined that the first condition is satisfied.

In the example in FIG. 2, the second condition is satisfied at a second time t2. The second condition includes: after the internal pressure Pi has lowered from the first value P1 to the second value P2, the internal pressure Pi becoming a third value P3 lower than the second value; and a difference ΔP2 between the second value P2 and the third value P3 being equal to or more than a third threshold.

For example, after the first time t1, the internal pressure Pi slowly lowers. This is due to, for example, leakage of air from the air cell 11. Further, when the change amount (difference ΔP2) of the internal pressure Pi due to the leakage has become equal to or more than the threshold (third threshold) (the second time t2), the second condition is satisfied.

When the second condition has been satisfied after the first condition in this manner, the controller conducts the first operation OP1. In the first operation OP1, the controller 72 changes the internal pressure Pi toward the second value P2.

For example, when only the first condition has been satisfied (for example, at the bed-departure), the controller 72 does not raise the internal pressure Pi in the air cell 11. Accordingly, when the user again has gotten on the air mattress 110 after the bed-departure state, the internal pressure Pi returns from the second value P2 to the first value P1. The internal pressure Pi returns to the state before the bed-departure to suppress the discomfort feeling.

On the other hand, after the first condition has been satisfied (at the bed-departure), when the second condition has been satisfied due to the leakage of air and the like, the controller 72 returns the internal pressure Pi to the second value P2. The second value P2 is the internal pressure Pi at the bed-departure. Accordingly, when the user again has gotten on the air mattress 110 after the bed-departure state, the internal pressure Pi returns from the second value P2 to the first value P1. The internal pressure Pi returns to the state before the bed-departure to suppress the discomfort feeling.

With the first operation OP1 as the above, a more comfortable air mattress can be provided.

As illustrated in FIG. 2, at a third time t3, the internal pressure Pi lowers due to the leakage of air and the like. At the third time t3, the change amount (difference $\Delta P2$) of the internal pressure Pi is smaller than the threshold (third threshold). Therefore, at the third time t3, the controller 72 does not conduct the first operation OP1.

The controller 72 may further conduct a second operation OP2, which will be described below. The second operation OP2 is conducted when the internal pressure Pi in the air cell 11 satisfies a third condition below.

The third condition includes: the internal pressure Pi rising to a fourth value P4 higher than the second value P2; and a difference $\Delta P3$ between the fourth value P4 and the second value P2 being equal to or more than a threshold (fourth threshold). The fourth threshold is, for example, approximately 0.4 kPa.

In the example in FIG. 2, at a fourth time t4, the third condition is satisfied. For example, at the fourth time t4, the user lies down on the air mattress 110. Accordingly, the internal pressure Pi in the air cell 11 rises. The rise in the internal pressure Pi is caused by the body weight of the user.

When the rise amount (difference $\Delta P3$) of the internal pressure Pi is equal to or more than the threshold (fourth threshold), the controller 72 conducts the second operation OP2. In the second operation OP2, the controller 72 changes the internal pressure Pi toward the first value P1 or a set fifth value P5. Accordingly, when the user again has gotten on the air mattress 110, the internal pressure Pi becomes the desired value (the first value P1 or the fifth value P5). Accordingly, the state of hardness (softness) that the user prefers can be provided to the user.

With the second operation OP2 as the above, a more comfortable air mattress can be provided.

The first value P1 may be a value detected immediately before the time when the first condition was satisfied at the first time t1. For example, the first value P1 may be a value used for the determination as to whether the first condition is satisfied. The detection is performed by, for example, the pressure sensor 31s. The detected value (first value P1) may be stored in the memory 78 and the like.

The fifth value P5 is set, for example, when the user manipulates the user interface device 60 (see FIG. 1(b)) and the like. As illustrated in FIG. 2, before the first time t1, the internal pressure Pi may gradually lower from the fifth value P5. This lowering of the internal pressure Pi is due to, for example, the leakage of air and the like. Further, at the first time t1, the internal pressure Pi suddenly changes. The first value P1 may be substantially the same as the fifth value P5. At least either of the first value P1 and the fifth value P5 may be stored in, for example, the memory 78 or the like.

At the time (in this example, a fifth time t5) after the second time t2 illustrated in FIG. 2, the internal pressure Pi becomes higher than the second value P2 in some cases. For example, when an object (an article, a child, or the like) lighter than the user gets on the air mattress 110, such the rise in the internal pressure Pi occurs. At the fifth time t5, the rise amount (difference $\Delta P3$) of the internal pressure Pi is smaller than the threshold (third threshold). Therefore, at the fifth time t5, the controller 72 does not conduct the second operation OP2. In this example, after the fifth time t5, the "light object" is removed, and the internal pressure Pi becomes, for example, substantially the second value P2. Thereafter, as described as the above, at the fourth time t4, the rise amount (difference $\Delta P3$) of the internal pressure Pi becomes equal to or more than the fourth threshold, and the controller 72 conducts the second operation OP2.

The second value P2 is a value detected, for example, when the first condition was satisfied at the first time t1. The detection is performed by, for example, the pressure sensor 31s. The detected value (second value P2) may be stored in the memory 78 or the like.

The controller 72 may conduct the abovementioned operation, on the basis of the first value P1, the second value P2, and the fifth value P5, stored in the memory 78.

As has been already described, the user interface device 60 (see FIG. 1(b)) that receives an input by the user may be provided. At this time, when the user interface device 60 receives an input to change the internal pressure Pi in the air cell 11, at least either of the first value P1 and the second value P2, stored in the memory 78, may be reset. When the user interface device 60 receives an input to change the internal pressure Pi in the air cell 11, the fifth value P5 stored in the memory 78 may be reset.

In the embodiment, the air mattress 110 may further include the sensor (pressure sensor 31s) that detects the first value P1 and the second value P2.

Figure 3:
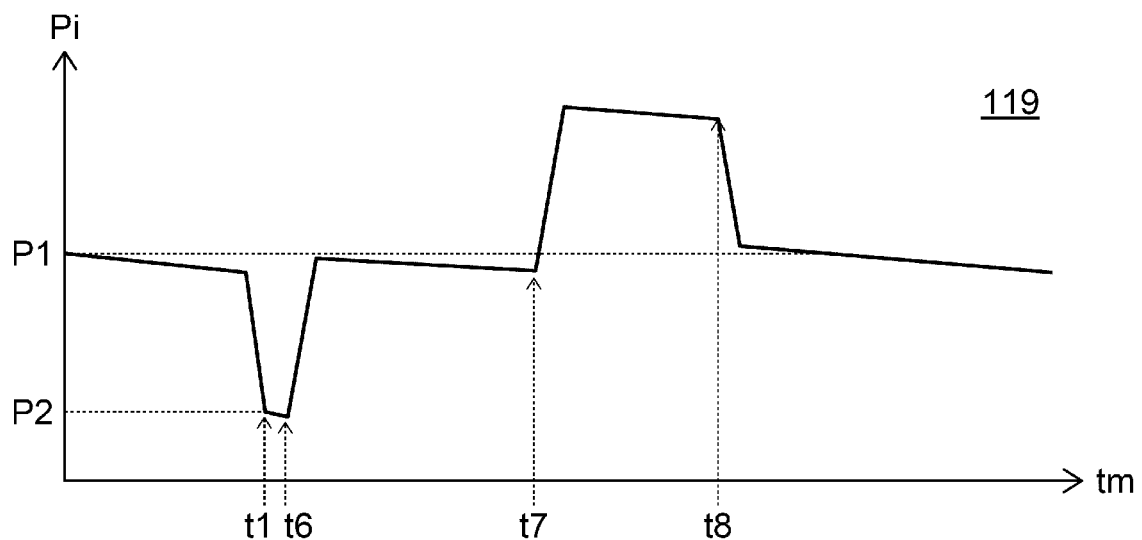
FIG. 3 is a schematic diagram exemplifying an operation of an air mattress in a reference example.

FIG. 3 is a schematic diagram exemplifying an operation of an air mattress in a reference example.

The horizontal axis in FIG. 3 represents time tm. The longitudinal axis represents the internal pressure Pi in the air cell.

In an air mattress 119 of a reference example illustrated in FIG. 3, the internal pressure Pi in the air cell 11 suddenly lowers at the first time t1, from the first value P1 to the second value P2. This sudden lowering is due to, for example, the bed-departure of the user and the like. Thereafter, at a sixth time t6, the internal pressure Pi further lowers from the second value P2 to a value less than the threshold. In the reference example, at the sixth time t6, the internal pressure Pi is raised to, for example, the first value P1. In the reference example, the slow lowering of the internal pressure Pi due to the leakage of air and the sudden lowering of the internal pressure Pi due to the bed-departure and the like are not distinguished. Therefore, when the user lay down on the air mattress 119 at a seventh time t7, the internal pressure Pi further rises from the first value P1. Therefore, the air mattress 119 becomes harder than the hardness that the user desires. A state that the user desires is not provided.

In this example, at the seventh time t7 and the subsequent time, the internal pressure Pi exceeds the allowable range of the set internal pressure. Therefore, for example, the controller 72 lowers the internal pressure Pi at an eighth time, and in this example, the internal pressure Pi becomes the first value P1.

In comparison with such a reference example, the air mattress 110 according to the embodiment can suppress the discomfort feeling. In the embodiment, a more comfortable air mattress can be provided.

In the first embodiment, for example, when the internal pressure Pi suddenly lowers, the controller 72 determines the bed-departure. The internal pressure Pi (second value P2) at this time corresponds to, for example, an "internal pressure at the bed-departure". For example, a set allowable value is provided to a difference of the internal pressure Pi from the internal pressure at the bed-departure. For example, in a case where a natural leakage has occurred, the controller 72 supplies air up to the internal pressure at the bed-departure. Meanwhile, when the internal pressure Pi rises to equal to or more than the threshold, exceeding the internal pressure at the bed-departure, the controller 72 may determine staying-in-bed. Thereafter, a set allowable value may be provided relative to the original set internal pressure, and the internal pressure at the bed-departure may be reset. In a case where the internal pressure Pi is changed by a manual manipulation or a program, the set internal pressure (fifth value P5), the internal pressure before the bed-departure (first value P1), and the internal pressure at the bed-departure (second value P2) may be reset.

In the first embodiment, for example, the internal pressure Pi is adjusted so as to become a value at the bed-departure. Therefore, the discomfort feeling when the user again lies down is suppressed. The discomfort feeling is suppressed, so that a manipulation of setting the internal pressure Pi (setting of hardness) becomes unnecessary, which is convenient. A comfortable air mattress can be provided.

Second Embodiment

In a second embodiment, the controller 72 further conducts, in addition to the first operation OP1, the second operation OP2, and the like, which are mentioned above, a third operation, which will be described below.

For example, the controller 72 may further conduct the third operation after the internal pressure Pi in the air cell 11 has satisfied the abovementioned first condition.

In the third operation, the controller 72 conducts at least either of an energy-saving operation and a maintenance operation.

The time when the first condition has been satisfied corresponds to, for example, the bed-departure. When the first condition has been satisfied, the air mattress 110 automatically becomes under the energy-saving operation. Alternatively, when the first condition has been satisfied, the air mattress 110 becomes under the maintenance operation. In the maintenance operation, the controller 72 operates, for example, the pump unit 31 at high output to dry the air cell unit 10. The output in the maintenance operation is higher than, for example, that in the second operation OP2 or the like. In the maintenance operation, for example, noise is larger than that in the second operation OP2 or the like.

In the second embodiment, for example, when the second value P2 is stored in the memory 78, the third operation different from the second operation OP2 is performed. In the second embodiment, a more comfortable and more convenient air mattress can be provided. The third operation is conducted, for example, at a fixed time or the like. For example, the conduct of the third operation may be started by a timer or the like.

In the embodiment, the pump unit 31 may include a DC pump 31d (see FIG. 1(c)). By using the DC pump 31d, for example, pulse width modulation (PWM) control may be conducted. Hereinafter, an example of the PWM control will be described.

Figure 4:
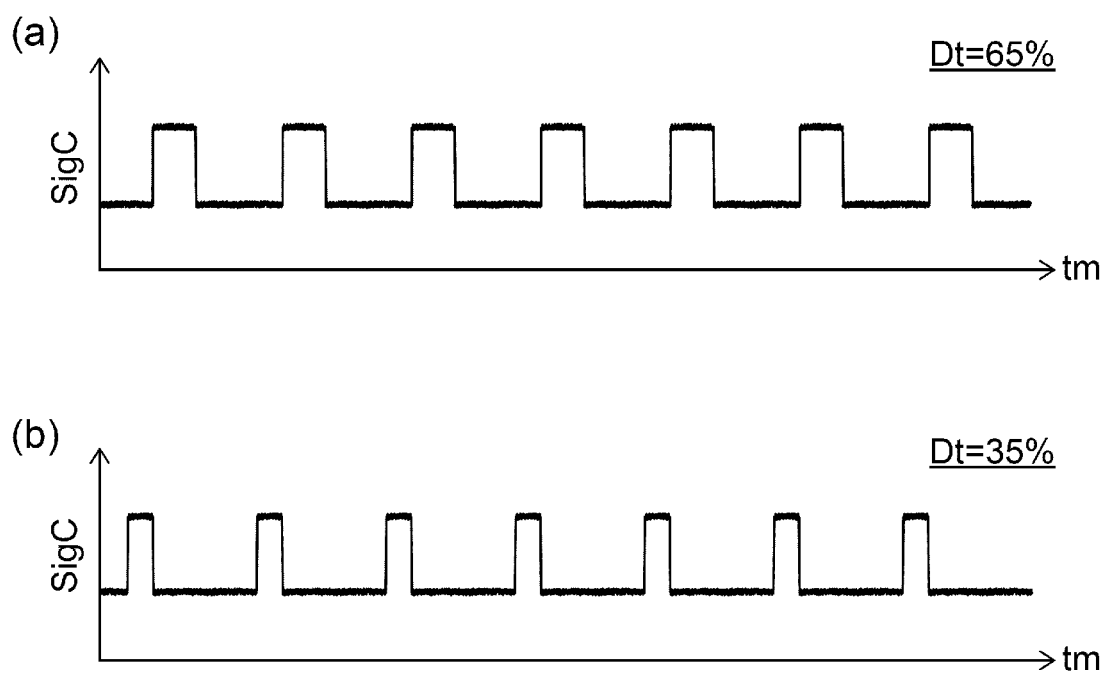
FIGS. 4(a) and 4(b) are schematic views exemplifying the operation in the air mattress according to the embodiment.

FIGS. 4(a) and 4(b) are schematic views exemplifying an operation in the air mattress according to the embodiment. The horizontal axis in these drawings represents time tm. The longitudinal axis exemplifies strength SigC of the PWM control signal. FIG. 4(a) corresponds to a case where a duty ratio Dt is 65%. FIG. 4(b) corresponds to a case where the duty ratio Dt is 35%. The PWM control signal is supplied, for example, from the controller 72 or a drive circuit controlled by the controller 72, to the DC pump 31d. The amount of supply and exhaust of air to and from the air cells 11 by the DC pump 31d can be controlled from a ratio of a period in a high state of the strength SigC of the PWM control signal and a period in a low state of the strength SigC thereof.

Figure 5:
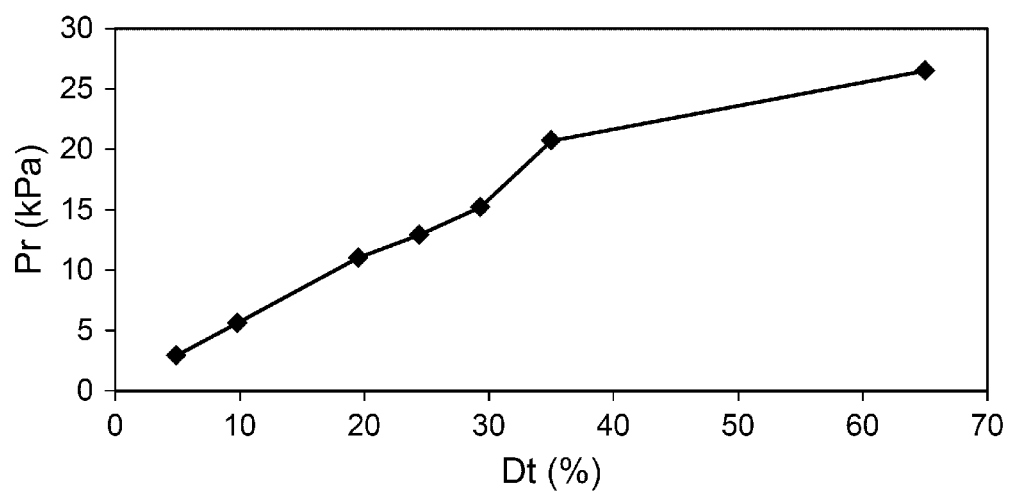
FIG. 5 is a graph exemplifying the operation in the air mattress according to the embodiment.

FIG. 5 is a graph exemplifying the operation in the air mattress according to the embodiment.

The horizontal axis in FIG. 5 represents the duty ratio Dt. The longitudinal axis represents a pressure Pr (kPa) in the supply and exhaust of air. As illustrated in FIG. 5, when the duty ratio Dt is high, the pressure Pr in the supply and exhaust of air becomes high. The duty ratio Dt in the PWM control is controlled to allow the amount of the supply and exhaust of air to and from the pump to be controlled.

In the embodiment, the pump unit 31 may include an AC pump. The internal pressure in the air cell 11 can be controlled by an operation of the AC pump. In this case, for example, by an applied voltage to the AC pump, an output (for example, the pressure Pr in the supply and exhaust of air) from the AC pump is controlled. In the AC pump, the applied voltage can be switched by phase control. In the phase control, a desired operation is unlikely to be obtained because an influence of the fluctuation in the frequency is received in some cases.

With the PWM control that uses the DC pump, for example, the output can be controlled with high accuracy in accordance with the pressure of the necessary supply and exhaust of air without substantially receiving an influence due to the variation of the AC power supply (for example, including the fluctuation in the frequency and the like). For example, the output can be minimized. With the PWM control that uses the DC pump, for example, compared with the case where the AC pump is used, sound to be generated can be made low. For example, the sound to be generated can be minimized. Accordingly, for example, better sleep comfort can be provided.

Hereinafter, an example of an operation of the air mattress 110 will be described.

Figure 6:
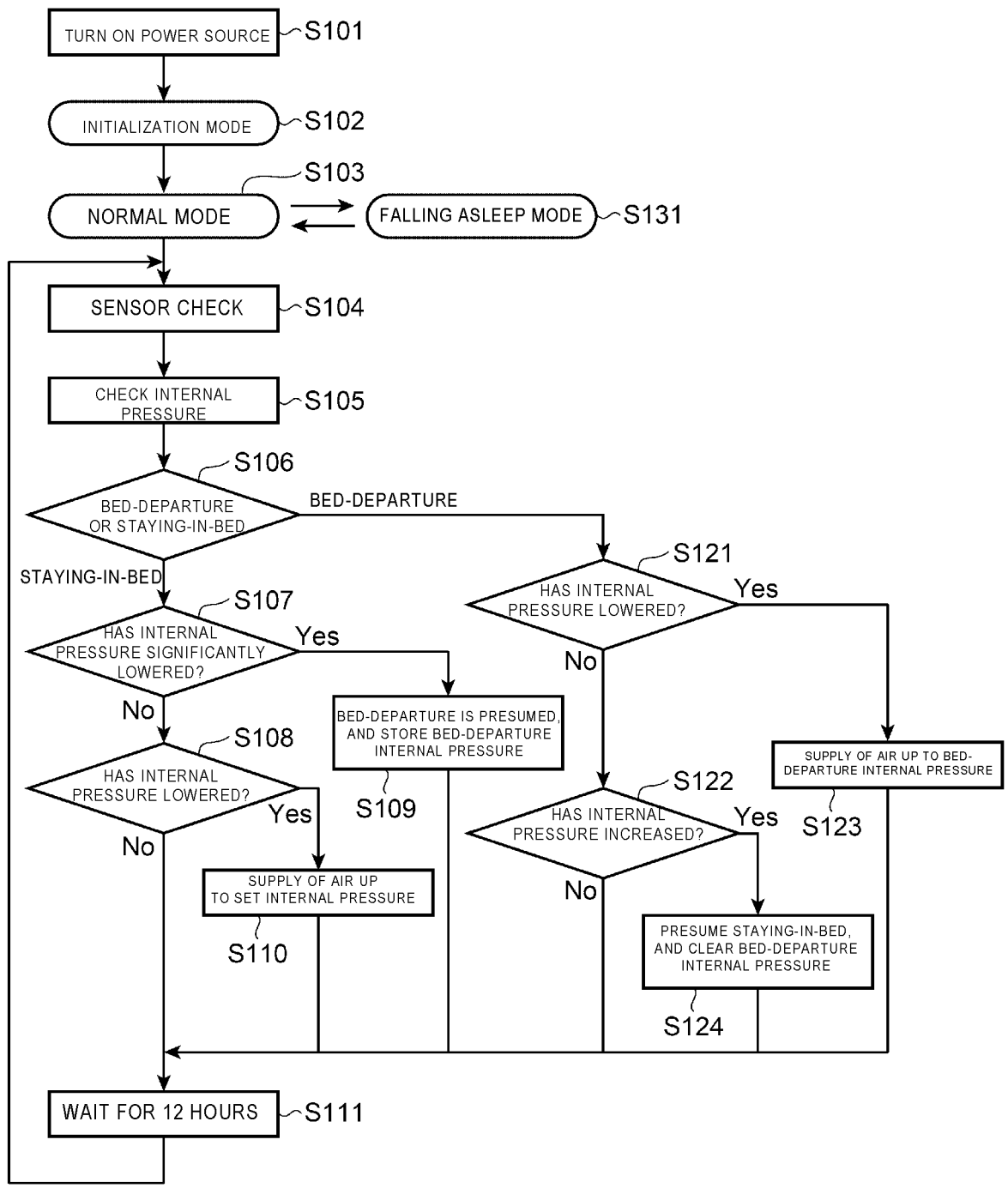
FIG. 6 is a flowchart exemplifying the operation in the air mattress according to the embodiment.

FIG. 6 is a flowchart exemplifying the operation in the air mattress according to the embodiment.

As illustrated in FIG. 6, a power supply is turned on (Step S101). Accordingly, for example, the operation is shifted to an initialization mode (Step S102). In the initialization mode, for example, the internal pressure (the pressure Pr) of the air cells 11 is set to a fixed value (for example, 5 kPa and the like). In the initialization mode, a user gets on the air cell unit 10. For example, in this state, the internal pressure (pressure Pr) is set to a fixed value.

The operation is shifted to a normal mode (Step S103). For example, on the basis of a state of the user or on the basis of the reception of a manipulation by the user interface device 60, the operation may be shifted to a falling asleep mode (Step S131). In the falling asleep mode (Step S131), on the basis of the reception of a manipulation of an "end", on the basis of a state of the user, or on the basis of the reception of a manipulation by the user interface device 60, the operation returns to the normal mode (Step S103).

In the normal mode, for example, a sensor check is conducted (Step S104). The internal pressure is checked (detected) (Step S105). In addition, at this time, it is determined whether a set (stored) state is "bed-departure" or "staying-in-bed" (Step S106). The "set (stored) state" is, for example, a state when a previous operation has ended (for example, Step S111, which is described later). For example, a state of the air mattress 110 that is set (stored) at the beginning may be "staying-in-bed", for example. At Step S106, if the state is "bed-departure", the operation proceeds to Step S121, which is described later. If the state is "staying-in-bed", the operation proceeds to Step S107.

At Step S107, it is determined whether the internal pressure has been significantly lowered. If it has been determined that the internal pressure has been significantly lowered, "bed-departure" is presumed, and the internal pressure at that time is stored as a "bed-departure internal pressure" (Step S109). Thereafter, for example, the operation waits for a fixed time (for example, 12 hours), (Step S111).

At Step S107, if it has been determined that the internal pressure has not significantly lowered, it is determined whether the internal pressure has lowered (Step S108). If it has been determined that the internal pressure has not lowered, the operation proceeds to Step S111.

If it has been determined that the internal pressure has lowered at Step S108, supply of air up to the set internal pressure is performed (Step S110). Thereafter, the operation proceeds to Step S111.

At Step S106, if it has been determined as "bed-departure", it is determined whether the internal pressure has lowered at Step S121. If it has been determined that the internal pressure has not lowered, it is determined whether the internal pressure has increased (Step S122). If it has been determined that the internal pressure has not increased, the operation proceeds to Step S111. If it has been determined that internal pressure has increased, "staying-in-bed" is presumed, and the "bed-departure internal pressure" is cleared (Step S124, for example, the memory is initialized). Thereafter, the operation proceeds to Step S111.

At Step S121, if it has been determined that the internal pressure has lowered, supply of air up to the "bed-departure internal pressure" is performed (Step S123). Thereafter, the operation proceeds to Step S111.

Such an operation is performed by, for example, a control device 70 (or the controller 72) or the like.

At Steps S106 to S110, Steps S121 to S124, and the like, the operation described related to FIG. 2 may be applied.

With the embodiment, a more comfortable air mattress can be provided.

Third Embodiment

An air mattress (for example, the air mattress 110: see FIGS. 1(a) to 1(c)) according to a third embodiment includes the air cell unit 10 including the air cells 11, and the controller 72 that controls the internal pressure Pi in the air cell 11. Hereinafter, an example of an operation of the controller 72 according to the third embodiment will be described. In the following explanation, the internal pressure Pi in the air cell 11 is detected, for example, by the pressure sensor 31s. The controller 72 acquires data (a signal can also be applicable) related to the internal pressure Pi detected by the pressure sensor 31s.

Figure 7:
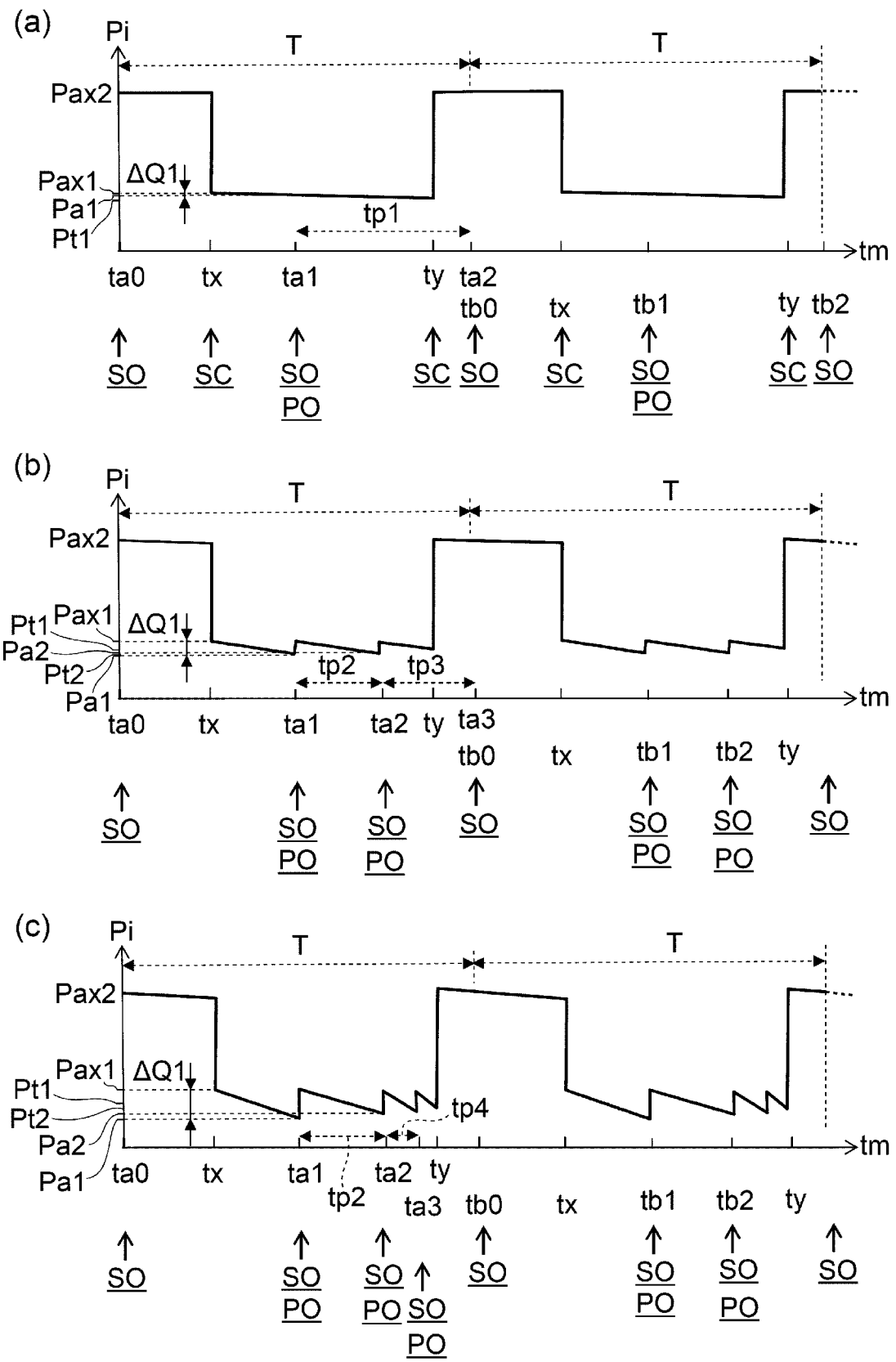
FIGS. 7(a) to 7(c) are schematic diagrams exemplifying an operation of an air mattress according to a third embodiment.

FIGS. 7(a) to 7(c) are schematic diagrams exemplifying an operation of the air mattress according to the third embodiment.

The horizontal axis in FIGS. 7(a) to 7(c) represents time tm. The longitudinal axis represents the internal pressure Pi in the air cell 11.

As illustrated in FIG. 7(a), in one example, at a time ta0, the internal pressure Pi is a value Pax2, which is high. At the time ta0, the user is present on the air mattress 110. At a time tx, the internal pressure Pi suddenly lowers. At the time tx, the user departs from the bed. At a first time ta1, the controller 72 acquires data (internal pressure Pa1) related to the internal pressure Pi. At this time, when data related to the internal pressure Pi is not abnormal, the controller 72 does not conduct an operation, which is described later, and the time tm is elapsed. In this example, at a time ty, the internal pressure Pi suddenly rises. At the time ty, a state where the user is present on the air mattress 110 is started. In this example, at a second time ta2, the controller 72 acquires data related to the internal pressure Pi. At this time, when data related to the internal pressure Pi is not abnormal, the controller 72 does not conduct an operation, which is described later, and the time tm is elapsed. Such an operation is repeatedly performed.

In other words, the respective times (the time ta0, the first time ta1, and the second time ta2) at the first cycle become respective times (a time tb0, a first time tb1, and a second time tb2) at the second cycle, and such an operation is repeated. For example, the time tm from the time ta0 to the second time ta2 corresponds to a cycle T. The cycle T is, for example, 24 hours. The time from the time ta0 to the first time ta1 is ½ of the cycle T, which is 12 hours. The time from the first time ta1 to the second time ta2 is ½ of the cycle T, which is 12 hours.

In one example, the time ta0 is, for example, at 22:00 on the first day. The first time ta1 is at 10:00 on the second day. The second time ta2 is at 22:00 on the second day.

In this example, for every the time duration of ½ of the cycle T, the controller 72 conducts an operation SO to acquire data related to the internal pressure Pi. The operation SO is a monitoring operation of the internal pressure Pi.

When an acquired internal pressure Pi (internal pressure P1) is less than a fixed value, the controller 72 may conduct an air-supplying operation PO to the air cells 11. For example, the controller 72 controls the pump unit 31 so as to supply the air to the air cells 11. At this time, for example, in a case where the time of the operation SO is during the daytime, the air-supplying operation PO is performed. For example, in a case where the time of the operation SO is during the night, the air-supplying operation PO may be omitted.

In the example in FIG. 7(a), the internal pressure Pa1 at the first time ta1 is the substantially same as a value Pax1 (reference value). For example, an absolute value of a difference ΔQ1 between the internal pressure Pa1 and the value Pax1 at the first time ta1 is smaller than a "fixed value related to the difference". In this case, the air-supplying operation PO is not performed. The value Pax1 is, for example, an "internal pressure at the bed-departure". The "internal pressure at the bed-departure" may be stored in the memory 78 or the like. FIG. 7(a) corresponds to a state where no abnormality is present in the air cells 11.

As illustrated in FIG. 7(a), the controller 72 may conduct an operation SC to acquire data related to sudden change in the internal pressure Pi. In FIGS. 7(b) and 7(c), for easy recognition of the drawings, illustration of the operation SC is omitted.

As illustrated in FIG. 7(b), in another example, at the time ta0, the internal pressure Pi is the value Pax2. At the time tx, the internal pressure Pi suddenly lowers. At the first time ta1, the controller 72 acquires the data (internal pressure Pa1) related to the internal pressure Pi. In this example, the internal pressure Pa1 at the first time ta1 is significantly lower than the value Pax1 (for example, the "internal pressure at the bed-departure"). For example, there is a case in which the abnormality such as a hole is present in the air cell 11, and the internal pressure Pi abnormally lowers.

For example, the absolute value of the difference ΔQ1 between the internal pressure Pa1 and the value Pax1 at the first time ta1 is equal to or more than a "fixed value related to the difference". In this case, the controller 72 shortens the interval of the monitoring operation (operation SO) of the internal pressure Pi. In the example in FIG. 7(b), after the first time ta1 at which the internal pressure Pi has been monitored, a next internal pressure Pi is monitored at the second time ta2, which is earlier than that in the example in FIG. 7(a). Accordingly, the state of the air cells 11 can be more accurately grasped. For example, in a case where abnormality such as a hole is present in the air cell 11, the abnormality can be grasped more rapidly. The air cell 11 can be caused to recover to an adequate state more rapidly.

For example, as for the internal pressure Pa1 at the first time ta1, a threshold (first threshold Pt1) is fixed. The first threshold Pt1 is, for example, a value lower than the "internal pressure at the bed-departure" by a "fixed difference". The internal pressure Pa1 at the first time ta1 is compared with the first threshold Pt1, and in accordance with a result thereof, the controller 72 changes the second time ta2 of the next monitoring.

In this manner, in the third embodiment, the controller 72 acquires the internal pressure Pa1 at the first time ta1, and acquires an internal pressure Pa2 at the second time ta2 after the first time ta1. The time from the first time ta1 to the second time ta2 in a case where the internal pressure Pa1 at the first time ta1 is equal to or more than the first threshold Pt1 is set as a first time period tp1 (see FIG. 7(a)). The time from the first time ta1 to the second time ta2 in a case where the internal pressure Pa1 at the first time ta1 is less than the first threshold Pt1 is set as a second time period tp2 (see FIG. 7(b)). In the embodiment, the second time period tp2 in a case where the internal pressure Pa1 is less than the first threshold Pt1 is shorter than the first time period tp1 in a case where the internal pressure Pa1 is equal to or more than the first threshold Pt1. Accordingly, for example, the state of the air cells 11 can be more accurately grasped. An abnormal state of the air cells 11 can be rapidly detected, and the air cells 11 can be caused to recover more rapidly to an adequate state. A more comfortable air mattress can be provided.

As illustrated in FIG. 7(b), for example, the controller 72 conducts the air-supplying operation PO to the air cells 11 in a case where the internal pressure Pa1 at the first time ta1 is less than the first threshold Pt1.

A threshold (second threshold Pt2) may be fixed as for the internal pressure Pa1 at the second time ta2. The second threshold Pt2 is, for example, a value lower than the "internal pressure at the bed-departure" by the "fixed difference". The second threshold Pt2 may be the same as the first threshold Pt1. In a case where the internal pressure Pa2 at the second time ta2 is less than the second threshold Pt2, the controller 72 may conduct the air-supplying operation PO to the air cells 11.

As illustrated in FIG. 7(b), the controller 72 acquires the internal pressure Pi at a third time ta3 after the second time ta2. In the example in FIG. 7(b), the third time ta3 is the time tb0.

In the embodiment, the internal pressure Pa2 at the second time ta2 may be compared with the second threshold Pt2, and in accordance with a result of the comparison, the third time ta3 may be changed. In the example illustrated in FIG. 7(b), the internal pressure Pa2 at the second time ta2 is equal to or more than the second threshold Pt2. On the other hand, in a case where the internal pressure Pa2 at the second time ta2 is less than the second threshold Pt2, an operation of FIG. 7(c), which will be described below, may be performed.

As illustrated in FIG. 7(c), in still another example, at the time ta0, the internal pressure Pi is the value Pax2. At the time tx, the internal pressure Pi suddenly lowers. At the first time ta1, the controller 72 acquires data related to the internal pressure Pi. In this example, the internal pressure Pa1 at the first time ta1 is less than the first threshold Pt1, and the time from the first time ta1 to the second time ta2 is the second time period tp2. In the example in FIG. 7(c), the internal pressure Pa2 at the second time ta2 is less than the second threshold Pt2. In this case, the controller 72 sets the third time ta3 at the next monitoring so as to be earlier than the third time ta3 in the case of FIG. 7(b). Accordingly, the state of the air cells 11 can be more accurately grasped. For example, the air cell 11 can be recovered more rapidly to the adequate state. A more comfortable air mattress can be provided.

The time from the second time ta2 to the third time ta3 in a case where the internal pressure Pa2 at the second time ta2 is equal to or more than the second threshold Pt2 is set as a third time period tp3 (see FIG. 7(b)). The time from the second time ta2 to the third time ta3 in a case where the internal pressure Pa2 at the second time ta2 is less than the second threshold Pt2 is set as a fourth time period tp4 (see FIG. 7(c)). The fourth time period tp4 in a case where the internal pressure Pa2 is less than the second threshold Pt2 is shorter than the third time period tp3 in a case where the internal pressure Pa2 is equal to or more than the second threshold Pt2. For example, the air cell 11 can be recovered more rapidly to the adequate state. A more comfortable air mattress can be provided.

For example, the fourth time period tp4 is shorter than the second time period tp2. For example, the fourth time period tp4 is equal to or more than 0.3 times and equal to or less than 0.8 times the second time period tp2. For example, the fourth time period tp4 is equal to or more than 0.45 times and equal to or less than 0.55 times the second time period tp2. For example, the fourth time period tp4 is substantially ½ of the second time period tp2.

For example, the fourth time period tp4 is equal to or more than 0.3 times and equal to or less than 0.8 times the third time period tp3. For example, the fourth time period tp4 is equal to or more than 0.45 times and equal to or less than 0.55 times the third time period tp3. For example, the fourth time period tp4 is substantially ½ of the third time period tp3.

For example, the second time period tp2 is equal to or more than 0.3 times and equal to or less than 0.8 times the first time period tp1. For example, the second time period tp2 is equal to or more than 0.45 times and equal to or less than 0.55 times the first time period tp1. For example, the second time period tp2 is substantially ½ of the first time period tp1.

For example, the first time period tp1 is 12 hours. For example, the second time period tp2 is 6 hours. The third time period tp3 is 6 hours. For example, the fourth time period tp4 is 3 hours.

By setting such relations, for example, the first time ta1 at which the internal pressure Pi is monitored is likely to be set during the daytime. When abnormality is present, the second time ta2 at which the internal pressure Pi is monitored can be likely to be the time before going-to-bed (FIG. 7(b)).

The controller 72 may conduct an operation of making notification when the internal pressure Pa1 at the first time ta1 is less than the first threshold Pt1. The controller 72 may make notification when the internal pressure Pa2 at the second time ta2 is less than the second threshold Pt2. The notification may include, for example, at least either of display and sound waves. The notification may include, for example, a "message" by a display unit of the user interface device 60.

As has been already described, the air mattress 110 includes the pressure sensor 31s that detects the internal pressure Pi. The controller 72 acquires the internal pressure Pi detected by the pressure sensor 31s. The acquisition of the internal pressure Pi may include the control by the controller 72 of the detection operation of the pressure sensor 31s.

In the third embodiment, the operations having been described related to the first embodiment and the second embodiment may be further conducted.

With the first to third embodiments, a more comfortable air mattress can be provided.

The embodiments may include the following configurations.

Configuration 1

An air mattress provided with: an air cell unit including an air cell; and
a controller that controls an internal pressure in the air cell, in which
the controller conducts a first operation when the internal pressure in the air cell satisfies a second condition after having satisfied a first condition,
the first condition includes the internal pressure becoming from a first value to a second value lower than the first value, a difference between the first value and the second value being equal to or more than a first threshold, and a change rate relative to time of the internal pressure from the first value to the second value being equal to or more than a second threshold,
the second condition includes, after the internal pressure has lowered from the first value to the second value, the internal pressure becoming a third value lower than the second value, and a difference between the second value and the third value being equal to or more than a third threshold, and
in the first operation, the controller changes the internal pressure toward the second value.

Configuration 2

The air mattress according to Configuration 1, in which
the controller conducts a second operation when the internal pressure in the air cell has satisfied a third condition,
the third condition includes the internal pressure rising to a fourth value higher than the second value, and a difference between the fourth value and the second value being equal to or higher than a fourth threshold, and
in the second operation, the controller changes the internal pressure toward the first value or a set fifth value.

Configuration 3

The air mattress according to Configuration 1 or 2, further provided with a memory that stores therein the first value and the second value.

Configuration 4

The air mattress according to Configuration 3 further provided with a user interface device that receives an input by a user, in which
when the user interface device has received an input to change the internal pressure in the air cell, the first value and the second value stored in the memory are reset.

Configuration 5

The air mattress according to any one of Configurations 1 to 4, further provided with a sensor that detects the first value and the second value.

Configuration 6

The air mattress according to any one of Configurations 1 to 5, in which
the controller further conducts a third operation after the internal pressure in the air cell has satisfied the first condition, and
in the third operation, the controller conducts at least either of an energy-saving operation and a maintenance operation.

Configuration 7

An air mattress provided with: an air cell unit including an air cell; and
a controller that controls an internal pressure in the air cell, in which
the controller
acquires the internal pressure at a first time, and
acquires the internal pressure at a second time after the first time, and
a second time period from the first time to the second time in a case where the internal pressure at the first time is less than a first threshold is shorter than a first time period from the first time to the second time in a case where the internal pressure at the first time is equal to or more than the first threshold.

Configuration 8

The air mattress according to Configuration 7, in which the controller supplies air to the air cell in a case where the internal pressure at the first time is less than the first threshold.

Configuration 9

The air mattress according to Configuration 7 or 8, in which the controller supplies air to the air cell in a case where the internal pressure at the second time is less than a second threshold.

Configuration 10

The air mattress according to Configuration 7 or 8, in which the controller
acquires the internal pressure at a third time after the second time, and
a fourth time period from the second time to the third time in a case where the internal pressure at the second time is less than a second threshold is shorter than a third time period from the second time to the third time in a case where the internal pressure at the second time is equal to or more than the second threshold.

Configuration 11

The air mattress according to Configuration 10, in which the fourth time period is shorter than the second time period.

Configuration 12

The air mattress according to Configuration 11, in which the fourth time period is equal to or more than 0.3 times and equal to or less than 0.8 times the second time period.

Configuration 13

The air mattress according to any one of Configurations 10 to 12, in which the fourth time period is equal to or more than 0.3 times and equal to or less than 0.8 times the third time period.

Configuration 14

The air mattress according to any one of Configurations 7 to 13, in which the second time period is equal to or more than 0.3 times and equal to or less than 0.8 times the first time period.

Configuration 15

The air mattress according to any one of Configurations 9 to 14, in which the controller makes notification when the internal pressure at the second time is less than the second threshold.

Configuration 16

The air mattress according to any one of Configurations 7 to 15, in which the controller makes notification when the internal pressure at the first time is less than the first threshold.

Configuration 17

The air mattress according to any one of Configurations 7 to 16, in which the first time period is 12 hours, and the second time period is 6 hours.

Configuration 18

The air mattress according to any one of Configurations 7 to 17, further provided with a sensor that detects the internal pressure, in which the controller acquires the internal pressure detected by the sensor.

In the foregoing, the embodiments of this disclosure have been described with reference to the specific examples. However, the present invention is not limited to these specific examples. For example, the specific configurations of the respective elements such as the air cell unit and the controller, which are included in the air mattress, can be included in the scope of the present invention, as long as those skilled in the art can similarly implement the present invention by the appropriate selection from the publicly known range, and obtain the similar effects.

The combination of any two or more elements in the specific examples within a technically possible range is included in the scope of the present invention as long as the gist of the present invention is included.

In addition, all the control devices and the air mattresses that can be implemented through the design changes as appropriate by those skilled in the art based on the control devices and the air mattresses described above as the embodiments of the present invention belong to the scope of the present invention as long as the gist of the present invention is included.

In addition, within the spirit of the present invention, those skilled in the art can conceive of various changes and modifications, and it is understood that these changes and modifications also belong to the scope of the present invention.

REFERENCE SIGNS LIST

10 . . . air cell unit, 11 . . . air cell, $11p$ . . . tube, 31 . . . pump unit, $31d$ . . . DC pump, $31s$ . . . pressure sensor, 40 . . . upper layer cushion unit, 60 . . . user interface device, 61, 62 . . . display input unit, 68 . . . cable, 70 . . . control device, 72 . . . controller, 78 . . . memory, $\Delta P1$ to $\Delta P3$ . . . difference, $\Delta Q1$ . . . difference, 110, 119 . . . air mattress, Dt . . . duty ratio, OP1, OP2 . . . first, second operation, P1 to P5 . . . first to fifth value, PO . . . air-supplying operation, Pa1, Pa2 . . . internal pressure, Pax1, Pax2 . . . value, Pi . . . internal pressure, Pr . . . pressure, Pt1, Pt2 . . . first, second threshold, Q1 . . . absolute value, SC . . . operation, SO . . . operation, SigC . . . strength, T . . . cycle, t1 to t7 . . . first to seventh time, ta0 . . . time, ta1 to ta3 . . . first to third time, tb0 . . . time, tb1, tb2 . . . first, second time, tm . . . time, tp1 to tp4 . . . first to fourth time period, tx, ty . . . time.

The invention claimed is:
1. An air mattress comprising:
an air cell unit;
a memory; and
a controller configured to:
monitor an internal pressure of the air cell unit;
determine a state of the air mattress to be an unoccupied state based on the internal pressure of the air cell unit;
store, in the memory, the internal pressure of the air cell unit monitored at a timing at which the state of the air mattress is determined to be the unoccupied state, as an unoccupied internal pressure;
detect an air leakage from the air cell unit based on a decrease of the internal pressure of the air cell unit from the unoccupied internal pressure while the determined state of the air mattress is the unoccupied state; and perform a first operation to increase the internal pressure of the air cell unit to the stored unoccupied internal pressure upon detecting the air leakage from the air cell unit.

2. The air mattress according to claim 1, wherein
the controller is configured to determine the air mattress to have turned into the unoccupied state when a first condition is satisfied,
the first condition including a decrease of the internal pressure of the air cell unit, which is from a first value to a second value lower than the first value, being equal to or greater than a first threshold value and a rate of the decrease being equal to or greater than a second threshold value, the second value being the unoccupied internal pressure stored in the memory.

3. The air mattress according to claim 2, wherein
the controller is configured to detect the air leakage from the air cell unit when a second condition is satisfied after the first condition is satisfied,
the second condition including a further decrease of the internal pressure of the air cell unit, which is from the second value to a third value lower than the second value, being equal to or greater than a third threshold value.

4. The air mattress according to claim 3, wherein
the controller is configured to perform a second operation to set the internal pressure of the air cell unit to the first value or a fifth value that is preset when a third condition is satisfied,
the third condition including an increase of the internal pressure of the air cell unit, which is from the second value to a fourth value higher than the second value, being equal to or greater than a fourth threshold value.

5. The air mattress according to claim 3, wherein the controller is configured to clear the unoccupied internal pressure stored in the memory in response to increase of the monitored internal pressure of the air cell unit.

6. The air mattress according to claim 5, further comprising:
a user interface device,
wherein upon the user interface device receiving a user input to change the internal pressure of the air cell unit, the unoccupied internal pressure stored in the memory is cleared.

7. The air mattress according to claim 3, further comprising:
a sensor configured to measure the internal pressure of the air cell unit,
wherein the controller monitors the internal pressure of the air cell unit measured by the sensor.

8. The air mattress according to claim 3, wherein
the controller is configured to perform a third operation when the first condition is satisfied,
the third operation including a maintenance operation.

9. The air mattress according to claim 3, wherein
the controller is configured to perform a third operation when the first condition is satisfied,
the third operation including an energy-saving operation.

10. An air mattress comprising:
an air cell unit; and
a controller configured to:
monitor an internal pressure of the air cell unit;
determine a state of the air mattress to be an unoccupied state when the internal pressure of the air cell unit satisfies a first condition, the first condition including a decrease of the internal pressure of the air cell unit, which is from a first value to a second value lower than the first value, being equal to or greater than a first threshold value and a rate of the decrease being equal to or greater than a second threshold value;
detect an air leakage from the air cell unit when the internal pressure of the air cell unit satisfies a second condition while the determined state of the air mattress is the unoccupied state, the second condition including a further decrease of the internal pressure of the air cell unit, which is from the second value to a third value lower than the second value, being equal to or greater than a third threshold value; and
perform a first operation to set the internal pressure of the air cell unit to the first value or a fifth value that is preset when a third condition is satisfied, the third condition including an increase of the internal pressure of the air cell unit, which is from the second value to a fourth value higher than the second value, being equal to or greater than a fourth threshold value.

11. The air mattress according to claim 10, wherein the controller is configured to perform a second operation to increase the internal pressure of the air cell unit upon detecting the air leakage from the air cell unit.

12. The air mattress according to claim 10, further comprising:
a memory in which the first value and the second value are stored.

13. The air mattress according to claim 12, further comprising:
a user interface device,
wherein upon the user interface device receiving a user input to change the internal pressure of the air cell unit, the first value and the second value stored in the memory are cleared.

14. The air mattress according to claim 10, further comprising:
a sensor configured to measure the internal pressure of the air cell unit,
wherein the controller monitors the internal pressure of the air cell unit measured by the sensor.

15. The air mattress according to claim 10, wherein
the controller is configured to perform a third operation when the first condition is satisfied,
the third operation including a maintenance operation.

16. The air mattress according to claim 10, wherein
the controller is configured to perform a third operation when the first condition is satisfied,
the third operation including an energy-saving operation.

* * * * *